Jan. 12, 1926.
H. A. KIRKLAND
AUTOMATIC CUT-OFF FOR HEATING DEVICES
Filed March 5, 1920
1,569,815
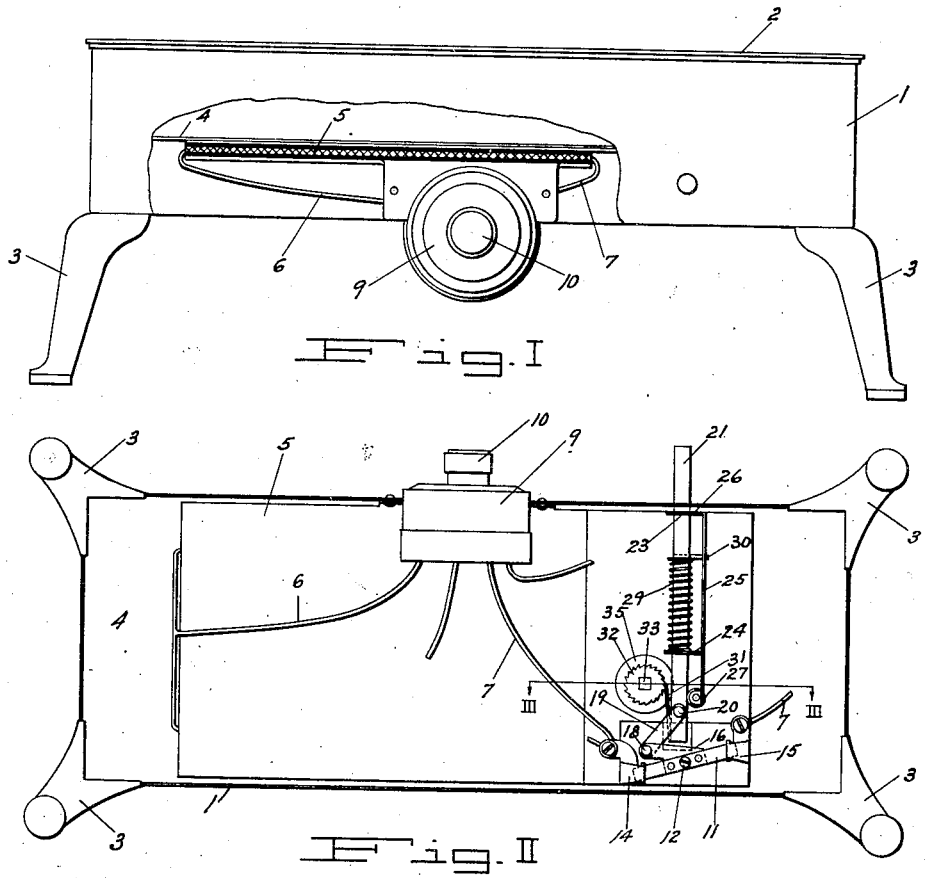
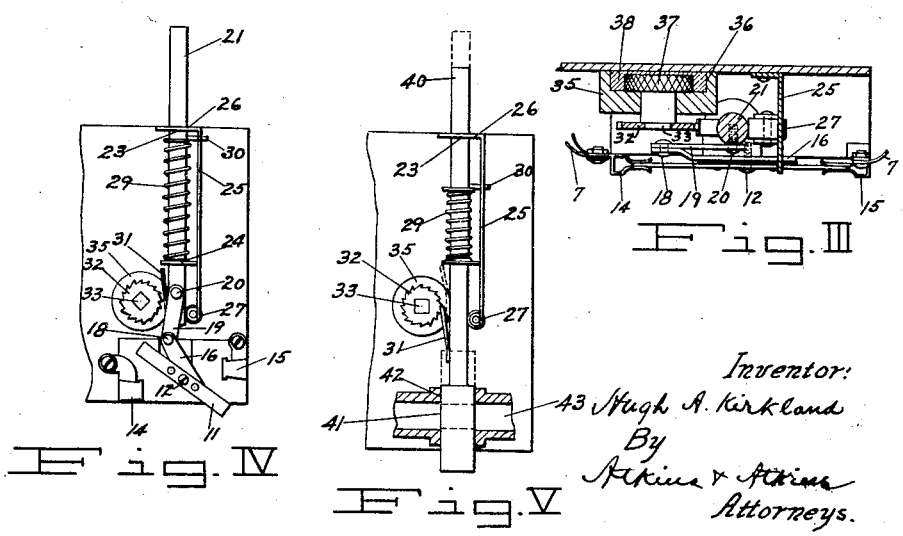
Inventor:
Hugh A. Kirkland
By
Atkins & Atkins
Attorneys.

Patented Jan. 12, 1926.

1,569,815

UNITED STATES PATENT OFFICE.

HUGH A. KIRKLAND, OF PORTLAND, OREGON, ASSIGNOR, BY DIRECT AND MESNE ASSIGNMENTS, TO ADOLPH A. DEKUM, OF PORTLAND, OREGON.

AUTOMATIC CUT-OFF FOR HEATING DEVICES.

Application filed March 5, 1920. Serial No. 363,561.

*To all whom it may concern:*

Be it known that I, HUGH A. KIRKLAND, a citizen of the United States of America, residing in Portland, in the county of Multnomah, in the State of Oregon, have invented certain new and useful Improvements in Automatic Cut-Offs for Heating Devices, of which the following is a specification, reference being had to the accompanying drawing.

My invention relates to heating devices of the kind that is adapted to be heated by means of the flow of a fluid heating agent, such, for example, as electricity or gas, and has for its object the production of an automatic thermal cut-off, or, in other words, a device designed and adapted to effect interruption of flow of the heating agent whenever the temperature of the object to be heated approximates, that is, to say, attains, substantially, a predetermined degree.

What constitutes my invention will be hereinafter specified in detail and succinctly set forth in the appended claims.

In the accompanying drawing,

Figure I is a side elevation of a sterilizer or apparatus for sterilizing, by application of heat, articles, for example, dental instruments. In this figure, the side wall is partly broken away to show the interior of the sterilizer containing an electric heating element in substantially the simplest form of embodiment.

Figure II is a bottom plan view of the subject matter of Figure I with its mechanism exposed, intended mainly to illustrate the details of my cut-out mechanism in simple and therefore preferred form of embodiment, adapted to control the flow of electricity as a fluid heating agent, the parts of the mechanism being shown in circuit-closing disposition.

Figure III is a section on the line III—III of Figure II, showing the illustrated mechanism in its true operative disposition in respect to the partition to which it is applied.

Figure IV is a detached bottom plan view of the cut-out mechanism as shown in Figure II, but showing it by contrast therewith, in circuit-breaking disposition of its parts.

Figure V is a view, similar to Figure IV, of a modification of my invention as applied to a gas heated device, showing in full lines the position of the parts thereof to correspond with the illustration made in Figure II, and showing in dotted lines the position of the parts corresponding to that shown in Figure IV.

Referring to the numerals on the drawing, 1 indicates a metal box or case which may be of rectangular shape illustrated or any other shape preferred, and which is provided preferably with a hinged cover 2, and with supporting legs 3. The design, construction, capacity, and dimensions of the case 1 may be varied at pleasure. The interior of it is shown as divided into two chambers by a horizontal partition 4 that is designated the heating wall of the case because underneath and in propinquity to it is operatively disposed an electric heating element 5, shown as an example of heating apparatus. The leads 6 and 7 thereof communicate, respectively, with any suitable controlling-switch indicated by its case 9 that is adapted by manipulation of its button 10 to bring the element 5 into circuit with a source of electric energy, not illustrated.

The heating element 5 may be of any ordinary or suitable type preferred and of any preferred shape and dimensions, and operable in any usual or preferred manner. One of the leads, for example 7, is broken by a switch-lever 11, which is pivoted, as indicated at 12, to a fixed support carried within the case 1. The opposite ends of the lever 11 when turned upon its pivot 12, swing between clip-contacts 14 and 15, respectively, or away from them, as the case may be, and so serve to cut in and to cut out electric fluid supply through the lead 7. It is to operate the lever 11, or any movable member of like function automatically and under predetermined conditions, that my invention is devised. To that end the lever may be provided with a projection 16 secured to it and extending from side of it, as in the oblique disposition indicated in Figures II to IV, inclusive. To the projection 16 is pivoted, as indicated at 18, a link 19, which is also pivoted, as indicated at 20, to a reciprocatory rod 21, working between fixed limits, in suitable bearings 23 and 24 provided for it in the case 1 or parts thereto appurtenant. The part illustrated as carrying the bearing 24 is an arm 25 that is secured at one end, as by a bend 26, made at right angles to it, to the case 1. The arm 25, besides the bearing 24, preferably carries at its free end an anti-friction roller 27, which, by reason of the resiliency of the arm, opposes resistance against end-thrust upon the link 19, and tends to lend freedom of reciprocatory movement to the rod 21 in its bearings 23 and 24. An expansive spring 29 that is representative of any equivalent power actuating means, is coiled about the rod 21 and confined between the bearing 24 and a stop-piece 30 on the rod 21. It tends yieldingly to drive the rod 21 outwardly through an aperture provided for it in the case 1, and so to actuate the lever 11 upon its pivot 12, as above specified and as shown in Figure IV, for instance.

Normally, the force of the spring 29 is effectually resisted by engagement of a leaf-spring pawl 31 secured to and projecting from the inner end of the rod 21, in consequence of its engagement with the teeth of a ratchet wheel 32 that is itself normally fixed. To the outer end of an arbor 33 that projects through an aperture provided for it in a receptacle, preferably a cylindrical case 35, the ratchet wheel 32 is secured, the case 35 being preferably fastened directly to the bottom of the partition 4 which constitutes the bottom of the upper chamber within the case 1, or that chamber, to heat which is the especial function of the element 5. Next to the partition 4, the case 35 is provided with a preferably cylindrical recess 36 whose transverse internal diameter is sufficiently greater than that of a disk or drum 37, accommodated within it, to define an annular space between the periphery of the drum 37 and the surrounding side wall of the recess 36, of capacity ample to accommodate a mass or volume of metal 38, or other material, of predetermined relatively low fusibility. The periphery of the drum 37 and the opposing face of the surrounding side wall of the recess 36 are preferably knurled so as to facilitate the effectual engagement between them of the fusible material 38 when cool enough to set, while, on the other hand, the joints between the walls of the recess 36 and the partition 4, and between the members 33, 35, and 37, respectively, are tight enough to effectually confine the metal 38 at all times and without leakage even when molten, within that portion of the recess 36 provided for it. By this means the metal 38 suffers, ordinarily, no diminution by use, but is always present ready to perform its required function as often as the condition predetermined recurs. By my invention the fusible material 38 is directly confined against the heating wall 4, and is thereby rendered promptly responsive to changes of temperature of the wall 4.

The ratchet wheel 32 is secured to the inner end of the arbor 33, and is consequently, in effect, integral with the drum 37 that is, as was specified, secured to the other end thereof.

The lead wires shown but not designated by numerals, in Figure II of the drawing, are merely leads, means for effecting variation of heat to the element 5, and need no further illustration, because they are of common acceptation in the art of electric heating.

In Figure V, I illustrate my cut-off mechanism modified to such an extent as to adapt it for the control of gas when used as a fluid heating agent instead of electricity. In that figure a reciprocatory rod 40, corresponding in all respects to the rod 21, is provided upon its end inside case 1 with a cut-off valve 41. The valve 41 is disposed in operative relationship to a valve-seat 42 provided for its accommodation in a gas supply pipe 43, in such manner as to close the valve upon the outward reciprocatory movement of the rod 40, and to open it upon movement of the rod 40 in the opposite direction. The connection between the valve and the rod may be direct or indirect and of variable detail, as desired, but the direct connection is preferred by reason of its simplicity. The pipe 43 is assumed to communicate in any ordinary or preferred manner, between a source of supply and a burner corresponding in function to the element 5, neither of which it is deemed necessary to illustrate.

The operation of my device may be described as follows:

In the form of embodiment illustrated in the first four figures of the drawing, it being one in which electricity is the heating medium employed, whenever the sterilizer is to be heated from the cold, for example, the mass of fusible material 38 is, until the temperature at which it fuses is attained, "set" in the space provided for it within the recess 36, and the drum 37 is thereby secured or, in effect, directly soldered to the circumambient walls of the recess 36. Consequently, the ratchet wheel 32, fixed to the end of the arbor 33 on the outside of the case 35, becomes a rigidly immoveable member and its teeth are adapted to engage and hold the pawl 31, when, by a push upon the outwardly projecting end of the rod 21, the spring 29 is compressed, as shown in Figure II. By the said movement of the rod 21 to compress the spring 29, the lever 11 is actuated to close the circuit between the clip-contacts 14 and 15, and afterwards, by proper manipulation of the controlling switch, indicated by the numeral 9, the heating element 5 may be energized.

The energizing of the element 5 will continue so long as the lever 11 makes circuit through its engagement with the clip-contacts 14 and 15. Should the heat of the partition 4 rise above a predetermined maximum degree, or, in other words, above the degree at which the mass of metal 38 is fusible, the fusible metal will then melt and when liquefied will become no more than a liquid bath, permitting the free rotation of the drum 37 within the recess 36. As soon as release of the drum 37 from the walls of the recess 36 is brought about by the liquefaction of the metal 38, as just described, the force of the spring 29 will assert itself to drive the rod 21 outwardly, bringing the parts linked therewith to the position shown in Figure IV of the drawing, in which position the lever 11 is turned upon its pivot 12 sufficiently to break the circuit through the lever 11 with the clip-contacts 14 and 15.

Afterwards, when by reason of the cutting off of the heating energy, the temperature of the partition 4 shall have diminished and reached a degree at which the mass of metal 38 again "sets", a push upon the rod 21 will restore the parts of the cut-out to the position shown in Figure II ready for a repetition of the cycle of operation described.

The operation, in respect to the form of embodiment of my invention shown in Figure V, is substantially the same as the already described, with the exception that the means employed are different. In that operation, the operation of the rod 40, which corresponds to the rod 21, effects stoppage of the flow of gas instead of the flow of electricity, with like effect in each instance, while the inwardly movement of the rod 40 restores the flow of gas through the pipe 43. A gas by-pass around the valve seat 42 to maintain, as is common and well known in this class of gas burners, a pilot light or its equivalent, may be, of course, employed, and appears, by reason of the familiarity of its use in the art, to require no illustration, any ordinary automatic gas-lighting device being contemplated as available in this connection.

From the foregoing specification it will appear that the drum 37, in special relationship to the receptacle 35 which holds it becomes, through combination with the medium 38, a key that automatically controls the flow of the fluid heating agent.

What I claim is:

In an automatic cut-off for heating devices adapted to be heated by a heating agent, the combination with means for controlling the heat supply, of a heating wall adapted to be heated by said agent, a receptacle having a recess upon one side and secured tightly against said heating wall with recess sealing effect, a mass of material of relatively low fusibility permanently confined within said recess by the heating wall, a movable member mounted upon a shaft extending into the fusible material within the receptacle, the said member being held in fixed position by said material when hard and liberated for movement when soft, and a reciprocatory rod, spring actuated in one direction and operatively connecting said movable member and the means for controlling the heat supply.

In testimony whereof I have hereunto set my hand.

HUGH A. KIRKLAND.